No. 713,890. Patented Nov. 18, 1902.
W. J. E. KOCH.
MINNOW PAIL.
(Application filed Mar. 24, 1902.)
(No Model.)
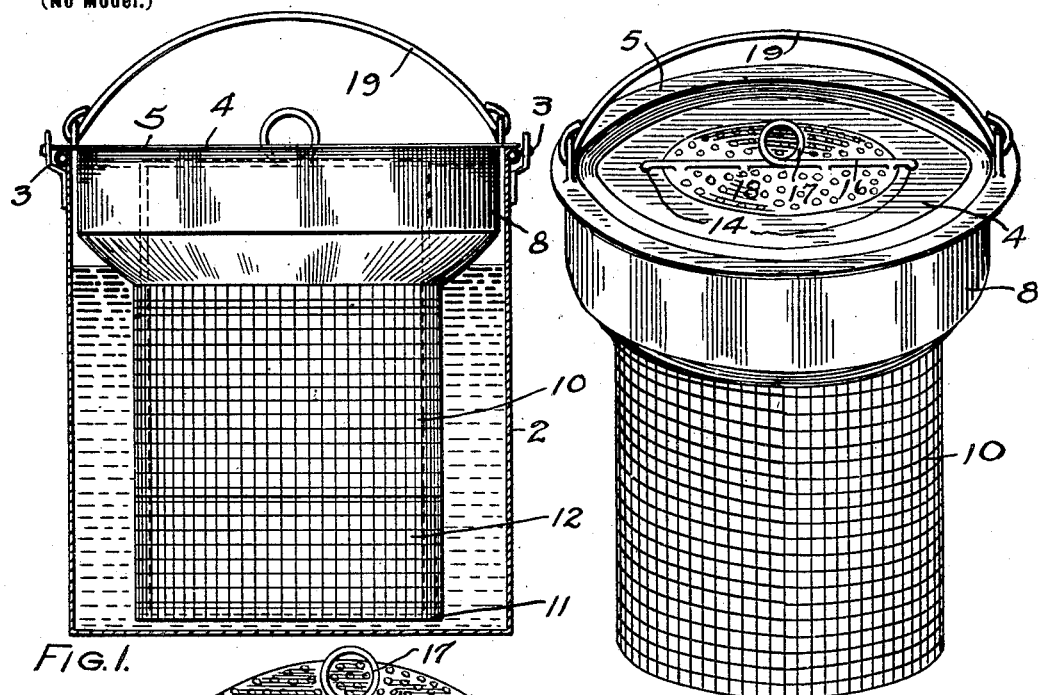
FIG.1.
FIG.2.
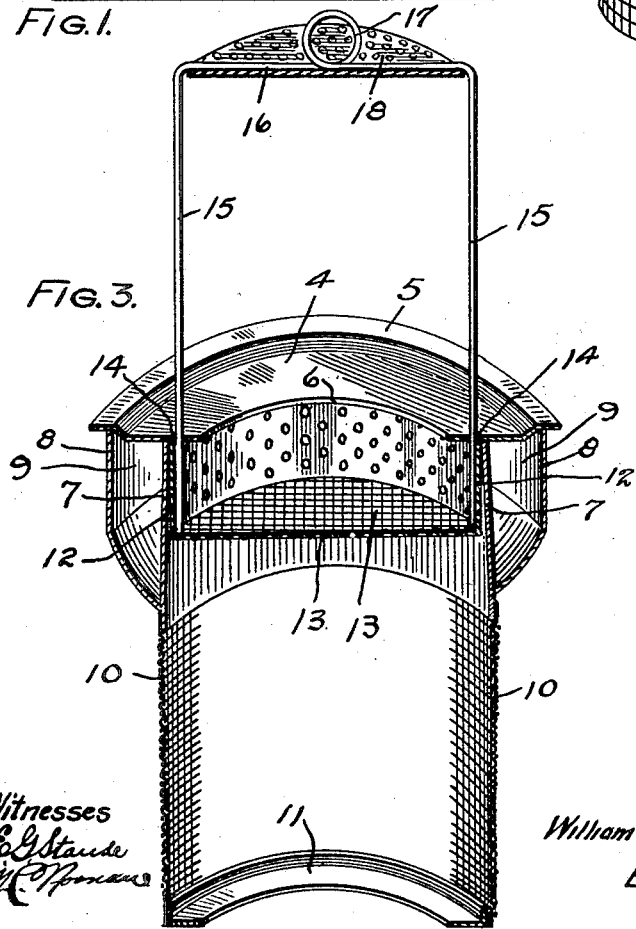
FIG.3.
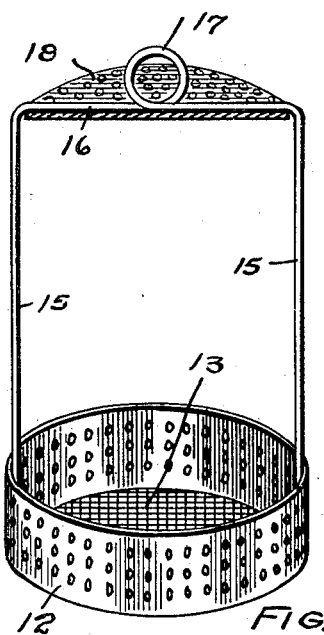
FIG.4.
Witnesses
E. G. Staude
M. C. Thomas
Inventor
William J. E. Koch
By Paul & Paul,
his attorneys

UNITED STATES PATENT OFFICE.

WILLIAM J. E. KOCH, OF MINNEAPOLIS, MINNESOTA, ASSIGNOR OF ONE-HALF TO LEWIS L. LANE, OF MINNEAPOLIS, MINNESOTA.

MINNOW-PAIL.

SPECIFICATION forming part of Letters Patent No. 713,890, dated November 18, 1902.

Application filed March 24, 1902. Serial No. 99,600. (No model.)

*To all whom it may concern:*

Be it known that I, WILLIAM J. E. KOCH, of Minneapolis, Hennepin county, Minnesota, have invented certain new and useful Improvements in Minnow-Pails, of which the following is a specification.

The invention relates to bait-pails adapted particularly for minnows, though other live bait, such as frogs, may be kept in it, if desired.

The object of the invention is to provide a pail or receptacle suitable to contain live bait when fishing from the shore or from a boat, and in the latter case adapted to be kept in the boat or deposited in the water at the side thereof, as preferred.

A further and particular object of the invention is to provide a pail from which the bait can be easily and quickly selected and removed as it is needed.

The invention consists generally in a pail, bucket, or other receptacle adapted to contain minnows or other live bait and provided with a movable bottom section or member with means for raising the same to elevate the bait to the top of the pail for convenient inspection and removal.

Further, the invention consists in various constructions and combinations, all as hereinafter described, and particularly pointed out in the claims.

In the accompanying drawings, forming part of this specification, Figure 1 is a vertical section of the outer pail or bucket, showing the position of the minnow-receptacle proper therein. Fig. 2 is a perspective view of the inner pail. Fig. 3 is a vertical section in perspective of the inner pail, showing the bottom member in its elevated position. Fig. 4 is a perspective view showing the movable bottom member or section removed from the pail.

In the drawings, 2 represents the outer pail or bucket adapted to contain a supply of water and having a suitable handle 3 for convenience in carrying. This bucket is employed in fishing from the shore or when the bait is kept in the boat, a sufficient quantity of water being placed in the bucket and renewed from time to time to keep the bait alive. The bait-pail proper consists of the top 4, having a flanged edge 5, that is adapted to rest upon the top of the pail 2, and a depressed middle portion provided with a central hole or opening 6. The depression in the top 4 permits ice to be carried thereon without danger of slipping off. Beneath the top and surrounding the hole 6 is a ring 7, tapered slightly from the bottom to the top, and outside said ring is a wall 8, forming therewith and with the top 4 an annular air-chamber 9. This chamber serves to support the bait-receptacle and permits of its being deposited in the water at the side of the boat within convenient reach of the fisherman. Secured to the lower edge of the ring 7 is a wall 10, which I have shown composed of wire mesh; but any other suitable material, such as perforated sheet metal, may be employed in place thereof. This wall forms the lower portion of the bait-pail proper, and at its lower end is provided with a flanged ring 11, that serves to stiffen and brace the walls and prevent their being accidentally twisted or bent out of shape. Through this ring 11 access is permitted to the bottom of the bait-pail. Within the ring 7 and the wall 10 I provide a comparatively narrow ring 12, preferably of sheet metal, and perforated and provided with a bottom 13, which I have shown composed of wire mesh, though other material may be employed, if preferred. This ring normally rests upon the ring 11 at the bottom of the pail, and the part 13 closes the opening through the ring 11 and prevents the escape of the bait through the bottom of the pail. The ring 12 also has a sufficiently close joint with the parts 7 and 10 to prevent minnows of the size usually used for fishing from getting in between them.

The top 4 is provided with holes 14, wherein the legs or rods 15, connected at their lower ends to the rings 12, are vertically slidable. These rods are connected by a cross-bar 16 at their upper ends that is provided with a finger loop or curl 17, and on said bar a cover 18 is secured by solder or other suitable means. This cover is adapted to close the hole 6 and prevent the accidental escape of the bait. The inner pail is provided with a suitable bail 19 for convenience in carrying when removed from the water-containing bucket.

In using the device the pail is placed within the inner receptacle, which is then set inside the bucket 2, that is partially filled with water, or the inner receptacle is deposited in the water at the side of the boat. Whenever a minnow is needed for bait, the fisherman grasping the loop 17 will lift the ring 12 and its bottom to the top of the pail, as shown in Fig. 3. The cover 18 will be raised simultaneously, and by reaching through the hole 6 the fisherman can select and remove the minnow that he desires to use, all the bait in the pail having been raised to a convenient point for inspection by the upward movement of the ring 12. The minnows will be lifted entirely out of the water, and as they lie upon the meshes of the bottom 13 the fisherman can easily pick up the one that he wants without handling or injuring the others.

In the ordinary minnow-pail it is customary or necessary to thrust the hand into the water and attempt to sieze the minnow desired. It is always difficult to do this and it frequently happens that the wrong minnow is caught, and sometimes several are injured before the one sought for is secured. By providing this movable bottom or auxiliary bucket I am able to raise all the bait in the pail out of the water and in position where it can be easily examined and the minnow of the proper size selected. The ring 7, being tapered and of less diameter at the top than at the bottom, will cause the part 12 to be wedged therein when in the position shown in Fig. 3, so that the fisherman need only use but one hand in opening the pail and selecting the bait. As soon as the desired bait has been removed from the pail the fisherman will strike the cross-bar 16 or the cover a quick sharp blow and the cover and auxiliary bucket will return by gravity to their normal position, the former closing the hole 6 and the latter submerging the bait within the water of the outer pail or in the stream or lake as the case may be. When it is desired to bait the hook again, the operation above described is repeated. I have shown the inner receptacle or bait-pail proper composed partially of wire mesh and partially of sheet metal; but it will be understood that I do not confine myself to the employment of these materials, as I may find it more advantageous to construct the pail entirely of sheet metal. In this matter I shall be governed by the comparative expense of manufacturing.

I am aware that bait-pails have been heretofore provided with air-chambers, and hence I make no claim broadly to the same herein, the essential feature of my invention residing in the movable bottom member or auxiliary bucket whereby the bait can be lifted to the top of the pail for convenience of inspection and removal.

I claim as my invention—

1. A bait-receptacle, comprising a bottomless pail having an opening in its top, a movable member adapted when in its normal position to close the lower end of said pail and form a bottom therefor, and means for raising said member.

2. A bait-receptacle, comprising a bottomless pail having an air-chamber and adapted to float upon the surface of the water and provided with an opening in its top, a movable member adapted when in its normal position to close the lower end of said pail and form a bottom therefor, and means for raising and lowering said member.

3. In a bait-pail having a suitable top provided with a removal opening, a movable bottom member or part, a bail slidable in said top and connected with said bottom part, and a cover carried by said bail and adapted to close said opening when said bottom member is in its depressed position and be raised above said opening when said bottom member is lifted.

4. A bottomless bait-pail, comprising walls having a top provided with an opening and a flanged bracing-ring in its open bottom and a perforated bucket normally resting upon said ring and adapted to be raised to lift the bait to a position for conveniently reaching the same through the opening in said top.

5. In a minnow-pail having perforated walls, a movable bottom member or bucket, means for raising the same to lift the minnows out of the water at the top of the pail, and the upper walls of said pail being tapered to engage and wedge said bottom member, for the purpose specified.

6. In a minnow-pail having perforated walls, and a top provided with a central opening, a ring 12 having a bottom 13 slidable within said pail, rods connected with said ring and adapted to slide in said top, and a cover carried by said rods and movable therewith for closing said central opening.

7. In a minnow-pail having perforated walls, a movable bottom member or bucket, means for raising the same to lift the minnows out of the water at the top of the pail, and means provided in the upper walls of said pail to engage and lock said bottom member, for the purpose specified.

In witness whereof I have hereunto set my hand this 20th day of March, 1902.

WILLIAM J. E. KOCH.

In presence of—
RICHARD PAUL,
M. C. NOONAN.